United States Patent
Haridas et al.

(10) Patent No.: US 10,310,467 B2
(45) Date of Patent: Jun. 4, 2019

(54) CLOUD-BASED CONTROL PLATFORM WITH CONNECTIVITY TO REMOTE EMBEDDED DEVICES IN DISTRIBUTED CONTROL SYSTEM

(71) Applicant: Honeywell International Inc., Morris Plains, NJ (US)

(72) Inventors: Harshal S. Haridas, Jamison, PA (US); Shane W. Booker, Tokyo (JP); Paul F. McLaughlin, Ambler, PA (US); Adrian Watson, Lambourn (GB); James A. Strilich, Phoenix, AZ (US); James Schreder, Landsdale, PA (US)

(73) Assignee: Honeywell International Inc., Morris Plains, NJ (US)

( * ) Notice: Subject to any disclaimer, the term of this patent is extended or adjusted under 35 U.S.C. 154(b) by 263 days.

(21) Appl. No.: 15/251,815

(22) Filed: Aug. 30, 2016

(65) Prior Publication Data

US 2018/0059629 A1 Mar. 1, 2018

(51) Int. Cl.
*G06F 17/30* (2006.01)
*H04M 15/00* (2006.01)
(Continued)

(52) U.S. Cl.
CPC ....... *G05B 19/042* (2013.01); *G05B 19/4155* (2013.01); *G05B 19/41855* (2013.01);
(Continued)

(58) Field of Classification Search
CPC .............. G05B 19/042; G05B 19/4155; G05B 2219/23276; G05B 2219/25232;
(Continued)

(56) References Cited

U.S. PATENT DOCUMENTS

| 5,657,390 A | 8/1997 | Elgamal et al. |
| 5,920,856 A | 7/1999 | Syeda-Mahmood |

(Continued)

FOREIGN PATENT DOCUMENTS

| DE | 102004030781 A1 | 3/2006 |
| KR | 100708002 B1 | 4/2007 |

(Continued)

OTHER PUBLICATIONS

Sirisutthidecha et al., Reliable Virtual Channels over VPN for Cloud, 5 pages (Year: 2015).*

(Continued)

*Primary Examiner* — Thuy Dao (57) ABSTRACT

A method includes transmitting, over a virtual private network (VPN) to a remotely-located control platform, a request for first information associated with a BOOTP protocol synchronization process. The method also includes receiving, from the control platform, a first response comprising the requested first information. The method further includes receiving, over a local network from an embedded device in a distributed control system, a request for second information associated with the BOOTP protocol. In addition, the method includes transmitting, to the embedded device, a second response comprising the requested second information.

19 Claims, 4 Drawing Sheets

(51) Int. Cl.
  *G06Q 30/02* (2012.01)
  *H04M 3/22* (2006.01)
  *G05B 19/042* (2006.01)
  *G05B 19/4155* (2006.01)
  *G05B 19/418* (2006.01)
(52) U.S. Cl.
  CPC ............. *G05B 2219/23276* (2013.01); *G05B 2219/25232* (2013.01); *G05B 2219/31449* (2013.01); *Y02P 90/185* (2015.11)
(58) Field of Classification Search
  CPC .......... G05B 2219/31449; H04L 29/06; H04L 29/12018; H04L 29/12009; H04L 69/329; H04L 61/10; H04L 41/0213; H04L 63/08; H04L 63/104; H04L 63/164; H04L 63/0272; H04L 63/029; H04L 45/125; H04L 45/22; H04W 12/06; H04W 12/04; H04W 12/4641; H04M 15/58; H04M 15/72
  See application file for complete search history.

(56) References Cited

U.S. PATENT DOCUMENTS

| | | | |
|---|---|---|---|
| 6,009,474 | A | 12/1999 | Lu et al. |
| 6,029,165 | A | 2/2000 | Gable |
| 6,108,686 | A | 8/2000 | Williams, Jr. |
| 6,202,023 | B1 | 3/2001 | Hancock |
| 6,480,896 | B1 | 11/2002 | Brown et al. |
| 6,560,656 | B1 | 5/2003 | O'Sullivan |
| 6,816,973 | B1 | 11/2004 | Gleichauf et al. |
| 7,130,891 | B2 | 10/2006 | Bernardin et al. |
| 7,151,966 | B1 | 12/2006 | Baier et al. |
| 7,206,286 | B2 | 4/2007 | Abraham et al. |
| 7,233,830 | B1 | 6/2007 | Callaghan et al. |
| 7,266,417 | B2 | 9/2007 | Liao |
| 7,286,897 | B2 | 10/2007 | Liu et al. |
| 7,313,447 | B2 | 12/2007 | Hsiung et al. |
| 7,343,152 | B1 | 3/2008 | Khorram |
| 7,461,403 | B1 | 12/2008 | Libenzi et al. |
| 7,548,977 | B2 | 6/2009 | Agapi et al. |
| 7,584,274 | B2 | 9/2009 | Bond et al. |
| 7,620,986 | B1 | 11/2009 | Jagannathan et al. |
| 7,636,764 | B1 | 12/2009 | Fein et al. |
| 7,684,876 | B2 | 3/2010 | Grgic |
| 7,693,581 | B2 | 4/2010 | Callaghan et al. |
| 7,706,310 | B2 | 4/2010 | Peng |
| 7,799,273 | B2 | 9/2010 | Popp |
| 7,870,106 | B1 | 1/2011 | Nguyen et al. |
| 7,873,719 | B2 | 1/2011 | Bishop et al. |
| 7,886,065 | B1 | 2/2011 | Satish et al. |
| 7,957,335 | B2 | 6/2011 | Durazzo et al. |
| 7,970,830 | B2 | 6/2011 | Staggs et al. |
| 9,438,628 | B2 | 9/2016 | Haridas et al. |
| 9,531,886 | B2* | 12/2016 | Wong ................ G06F 16/24573 |
| 9,553,997 | B2* | 1/2017 | Sharma ............ G06F 16/24573 |
| 9,891,930 | B2* | 2/2018 | Gupta ................... G06F 9/4488 |
| 10,129,337 | B2* | 11/2018 | Lin ......................... H04L 69/04 |
| 10,140,338 | B2* | 11/2018 | Lee ...................... H04L 63/105 |
| 10,165,447 | B2* | 12/2018 | Raleigh ............ G06Q 10/06375 |
| 2002/0078382 | A1 | 6/2002 | Sheikh et al. |
| 2003/0014498 | A1 | 1/2003 | Kreidler et al. |
| 2003/0061212 | A1 | 3/2003 | Smith et al. |
| 2003/0061481 | A1 | 3/2003 | Levine |
| 2003/0088650 | A1 | 5/2003 | Fassold et al. |
| 2003/0120778 | A1 | 6/2003 | Chaboud et al. |
| 2003/0182359 | A1 | 9/2003 | Vorchik et al. |
| 2004/0002943 | A1 | 1/2004 | Merrill et al. |
| 2004/0128539 | A1 | 7/2004 | Shureih |
| 2004/0153531 | A1 | 8/2004 | Gu |
| 2004/0260769 | A1 | 12/2004 | Yamamoto |
| 2005/0021594 | A1 | 1/2005 | Bernardin et al. |
| 2005/0021705 | A1 | 1/2005 | Jurisch |
| 2005/0076245 | A1 | 4/2005 | Graham et al. |
| 2005/0195840 | A1 | 9/2005 | Krapp et al. |
| 2005/0256735 | A1 | 11/2005 | Bayne |
| 2005/0276228 | A1 | 12/2005 | Yavatkar et al. |
| 2005/0278441 | A1 | 12/2005 | Bond et al. |
| 2006/0004786 | A1 | 1/2006 | Chen et al. |
| 2006/0059163 | A1 | 3/2006 | Frattura et al. |
| 2006/0085393 | A1 | 4/2006 | Modesitt |
| 2006/0143432 | A1* | 6/2006 | Rothman ............... G06F 9/4416 713/2 |
| 2006/0155633 | A1 | 7/2006 | Fellenstein et al. |
| 2006/0184626 | A1 | 8/2006 | Agapi et al. |
| 2006/0230149 | A1 | 10/2006 | Jackson |
| 2006/0282876 | A1 | 12/2006 | Shelest |
| 2007/0055702 | A1 | 3/2007 | Fridella et al. |
| 2007/0074288 | A1 | 3/2007 | Chang et al. |
| 2007/0157286 | A1 | 7/2007 | Singh et al. |
| 2008/0120414 | A1 | 5/2008 | Kushalnagar et al. |
| 2008/0159289 | A1 | 7/2008 | Narayanan et al. |
| 2008/0163370 | A1 | 7/2008 | Maynard |
| 2008/0208361 | A1 | 8/2008 | Grgic |
| 2008/0270523 | A1 | 10/2008 | Parmar et al. |
| 2008/0295173 | A1 | 11/2008 | Tsvetanov |
| 2009/0058088 | A1 | 3/2009 | Pitchford et al. |
| 2009/0070474 | A1* | 3/2009 | Aura ................... H04L 61/2015 709/228 |
| 2009/0125370 | A1 | 5/2009 | Blondeau et al. |
| 2009/0132070 | A1 | 5/2009 | Ebrom et al. |
| 2009/0172035 | A1 | 7/2009 | Lessing et al. |
| 2009/0177289 | A1 | 7/2009 | Glanzer et al. |
| 2009/0178108 | A1 | 7/2009 | Hudis et al. |
| 2009/0210071 | A1 | 8/2009 | Agrusa et al. |
| 2009/0271012 | A1 | 10/2009 | Kopka et al. |
| 2009/0300151 | A1 | 12/2009 | Friedman et al. |
| 2009/0300210 | A1 | 12/2009 | Ferris |
| 2009/0300635 | A1 | 12/2009 | Ferris |
| 2010/0022231 | A1 | 1/2010 | Heins et al. |
| 2010/0023151 | A1 | 1/2010 | Shieh et al. |
| 2010/0042720 | A1 | 2/2010 | Stienhans et al. |
| 2010/0161817 | A1 | 6/2010 | Xiao |
| 2010/0256794 | A1 | 10/2010 | McLaughlin et al. |
| 2010/0256795 | A1 | 10/2010 | McLaughlin et al. |
| 2010/0257605 | A1 | 10/2010 | McLaughlin et al. |
| 2011/0214157 | A1 | 9/2011 | Korsunsky et al. |
| 2011/0231450 | A1 | 9/2011 | Sinha |
| 2012/0174182 | A1 | 7/2012 | Neely |
| 2013/0111211 | A1 | 5/2013 | Winslow et al. |
| 2014/0007253 | A1 | 1/2014 | Hardt |
| 2014/0122860 | A1* | 5/2014 | Jai ......................... G06F 9/4416 713/2 |
| 2015/0215339 | A1* | 7/2015 | Chernoguzov ......... H04L 63/06 726/1 |
| 2016/0103585 | A1* | 4/2016 | Varadharajan .... G06F 16/24575 715/810 |
| 2016/0314067 | A1* | 10/2016 | Medovich ........... G06F 12/1009 |
| 2017/0230459 | A1* | 8/2017 | Lin ......................... H04L 69/04 |
| 2018/0137512 | A1* | 5/2018 | Georgiadis ............ H04L 9/3239 |

FOREIGN PATENT DOCUMENTS

| | | |
|---|---|---|
| WO | 2005020179 A1 | 3/2005 |
| WO | 2008088661 A1 | 7/2008 |
| WO | 2009046095 A1 | 4/2009 |
| WO | 2015112463 A1 | 7/2015 |

OTHER PUBLICATIONS

Croft et al., RFC 951, Internet Engineering Task Force, 1985, pp. 1-12.
Alexander et al., RFC 2132, Internet Engineering Task Force, 1997, pp. 1-34.
International Search Report dated Apr. 28, 2015 in connection with International Patent Application No. PCT/US2015/011937, 5 pages.
Written Opinion of International Searching Authority dated Arpil 28, 2015 in connection with International Patent Application No. PCT/US2015/011937, 6 pages.

(56) References Cited

OTHER PUBLICATIONS

11 Real-Time Data Hosting . . . 11, 2000-2009, 1 page, available at www.industrialevolution.com/ms_services_host.html.
Notification of Transmittal of the International Search Report and the Written Opinion of the International Searching Authority, or the Declaration dated Oct. 29, 2010 in connection with International Patent Application No. PCT/US2010/028208.
Notification of Transmittal of the International Search Report and the Written Opinion of the International Searching Authority, or the Declaration dated Oct. 29, 2010 in connection with International Patent Application No. PCT/US2010/028218.
Notification of Transmittal of the International Search Report and the Written Opinion of the International Searching Authority, or the Declaration dated Oct. 29, 2010 in connection with International Patent Application No. PCT/US2010/028210.
Paul F. McLaughlin, et al., "Cloud Computing as a Basis for a Process Historian", U.S. Appl. No. 12/416,830, filed Apr. 1, 2009.
Paul F. McLaughlin, et al., "Cloud Computing for a Manufacturing Execution System", U.S. Appl. No. 12/416,790, filed Apr. 1, 2009.
Paul F. McLaughlin, et al., "Cloud Computing as a Basis for Equipment Health Monitoring Service", U.S. Appl. No. 12/416,848, filed Apr. 1, 2009.
Communication pursuant to Article 94(3) EPC dated Mar. 15, 2013 in connection with European Patent Application No. 10 764 816.4.
Supplementary European Search Report dated Mar. 4, 2013 in connection with European Patent Application No. EP 10 76 4816.
Zheng Wang, et al., "Prefetching in World Wide Web", IEEE Global Telecommunications Conference, Nov. 1996, p. 28-32.
Supplementary European Search Report dated Nov. 19, 2012 in connection with European Patent Application No. EP 10 76 4813.
Final Office Action dated Feb. 10, 2012 in connection with U.S. Appl. No. 12/416,830.
Kevin P. Staggs, et al., "Cloud Computing for an Industrial Automation and Manufacturing System", U.S. Appl. No. 12/416,859, filed Apr. 1, 2009.
Enrique Castro-Leno, et al., "IT and business Integration through the Convergence of Virtualization, SOA and Distributed Computing," IEEE International Conference on Business Engineering, 2008, pp. 615-620.
"IPsec," Jun. 15, 2014, 10 pages, available at www.wikipedia.org.
Bootstrap Protocol, Mar. 2014, 3 pages available at www.wikipedia.org.
International Search Report and Written Opinion of the International Searching Authority for PCT Patent Application No. PCT/US2017/046902 dated Nov. 23, 2017, 9 pages.

* cited by examiner

CLOUD-BASED CONTROL PLATFORM WITH CONNECTIVITY TO REMOTE EMBEDDED DEVICES IN DISTRIBUTED CONTROL SYSTEM

TECHNICAL FIELD

This disclosure relates generally to industrial process control and automation systems. More specifically, this disclosure relates to a cloud-based control platform with connectivity to remote embedded devices in a distributed control system.

BACKGROUND

Industrial process control and automation systems are often used to automate large and complex industrial processes. These types of systems routinely include various components including sensors, actuators, and controllers. The controllers typically receive measurements from the sensors and generate control signals for the actuators.

Process control and automation systems implemented as distributed control systems (DCS) are designed to control physical components with priorities given to system timing, deployment, availability, impact of failure, and safety. A typical DCS also has requirements to support longer component lifetimes, extensive patch verification and management, and different system operation expertise. These requirements may be implemented to avoid significant risk to the health and safety of human lives, serious damage to the environment, financial issues such as production losses, and negative impact to the economy.

Many DCS vendors have evolved their systems by adopting information technology (IT) systems for DCS functionalities and adopted commercial off the shelf (COTS) solutions, open standards, and open protocols. However, this evolution has been challenging due to frequent changes in IT environments and due to fundamental differences between DCS and IT systems.

SUMMARY

This disclosure provides a cloud-based control platform with connectivity to remote embedded devices in a distributed control system.

In a first embodiment, a method includes transmitting, over a virtual private network (VPN) to a remotely-located control platform, a request for first information associated with a BOOTP protocol synchronization process. The method also includes receiving, from the control platform, a first response including the requested first information. The method further includes receiving, over a local network from an embedded device in a distributed control system, a request for second information associated with the BOOTP protocol. In addition, the method includes transmitting, to the embedded device, a second response including the requested second information.

In a second embodiment, an apparatus includes at least one network interface configured to receive and transmit data over at least one network. The apparatus also includes at least one processing device configured to control the at least one network interface to transmit, over a VPN to a remotely-located control platform, a request for first information associated with a BOOTP protocol synchronization process. The at least one processor is also configured to control the at least one network interface to receive, from the control platform, a first response including the requested first information. The at least one processor is further configured to control the at least one network interface to receive, over a local network from an embedded device in a distributed control system, a request for second information associated with the BOOTP protocol. In addition, the at least one processor is configured to control the at least one network interface to transmit, to the embedded device, a second response including the requested second information.

In a third embodiment, a system includes an embedded device in a distributed control system. The system also includes a control platform configured for communication with the distributed control system over a VPN, where the control platform is located remotely from the embedded device, the control platform also configured to support native communication with the embedded device. The system further includes a bootstrapping server communicatively coupled to the embedded device by a local network. The bootstrapping server is configured to transmit, over the VPN to the control platform, a request for first information associated with a BOOTP protocol synchronization process. The bootstrapping server is also configured to receive, from the control platform, a first response including the requested first information. The bootstrapping server is further configured to receive, over the local network from the embedded device, a request for second information associated with the BOOTP protocol. In addition, the bootstrapping server is configured to transmit, to the embedded device, a second response including the requested second information.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
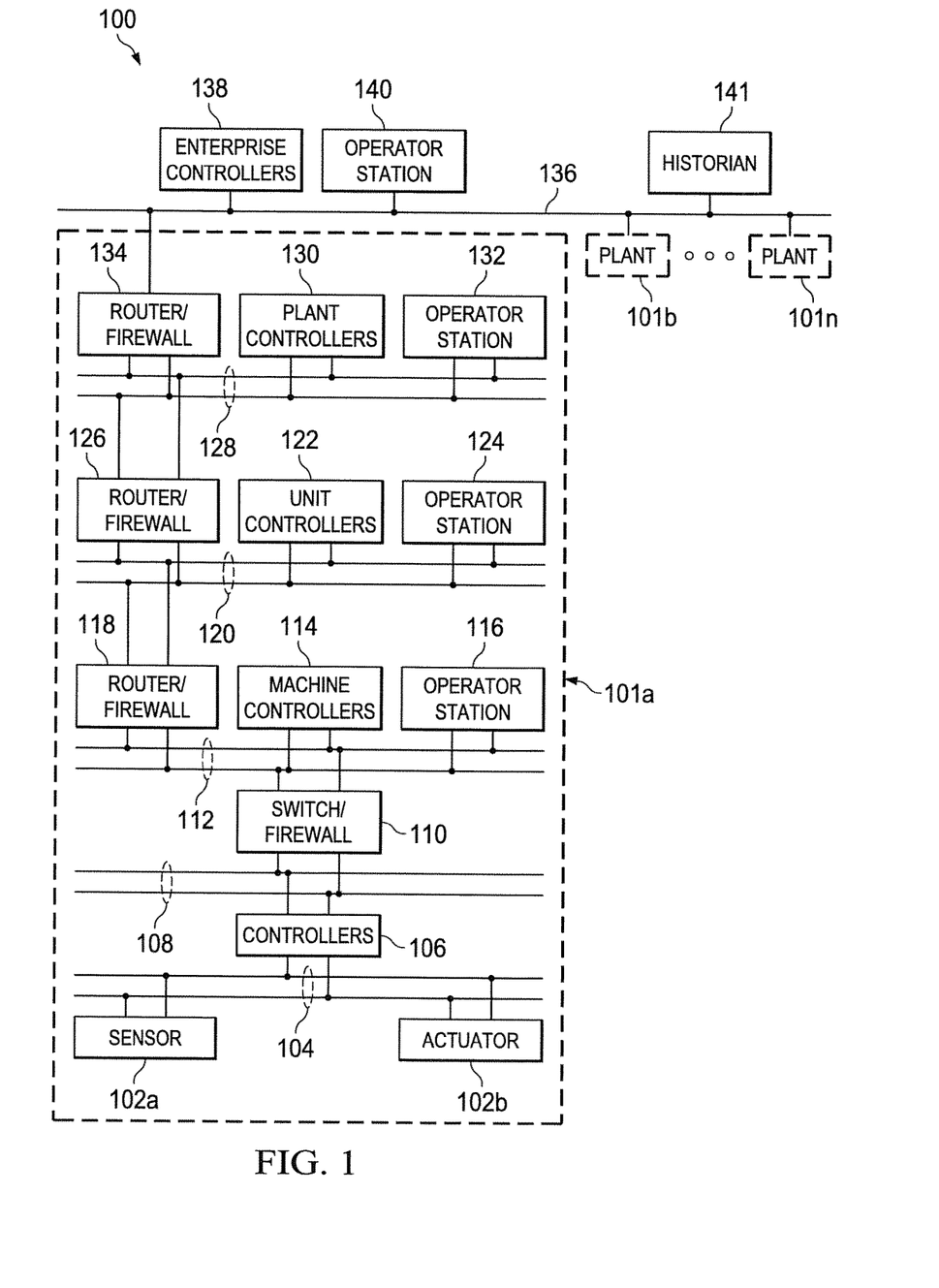
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Additionally or alternatively, each controller 122 could represent a multivariable controller, such as a HONEYWELL C300 controller. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers and operator stations could include one or more processing devices and one or more memories for storing instructions and data used, generated, or collected by the processing device(s). Each of the controllers and operator stations could also include at least one network interface, such as one or more Ethernet interfaces or wireless transceivers.

As described in more detail below, various components in the system 100 could be designed or modified to support a cloud-based virtual engineering platform that supports secure communications with remotely-located controllers. For example, one or more of the operator stations 116, 124, 132, 140 or one or more of the controllers 114, 122, 130, 130 could be implemented in a cloud-based environment that communicates with one or more remotely-located controllers 106 over a virtual private network (VPN) or other secure network.

Although FIG. 1 illustrates one example of an industrial process control and automation system 100, various changes may be made to FIG. 1. For example, the system 100 could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment in which a cloud-based virtual engineering platform can be supported for secured communication with remotely-located controllers. This functionality can be used in any other suitable system, and the system need not be related to industrial process control and automation.

As discussed above, process control and automation systems implemented as distributed control systems (DCS) are designed to control physical components with specific priorities given to various characteristics. The APPLICATION CONTROL ENVIRONMENT (ACE) by HONEYWELL INTERNATIONAL INC. is an example of an open IT system integrated with a DCS, namely the EXPERION DCS by HONEYWELL INTERNATIONAL INC. The ACE system typically executes on a server-grade computing platform and provides a standard control platform execution environment. The ACE system can also be utilized for a wide variety of applications that do not require an embedded controller. For example, the ACE system can be used for supervisory control applications, procedural operations using standard function blocks, and custom applications using custom algorithm blocks. Other DCS features include multiple selectable execution periods, shared standard function blocks with different types of controllers, inter-cluster communication, control integration and peer-to-peer integration with other embedded controllers using native communication protocols (such as the EXPERION CONTROL DATA ACCESS (CDA) protocol by HONEYWELL), Open Platform Communications (OPC) integration into a control environment, and multivariable control and optimization technology.

In contrast, IT systems are often primarily used to manage corporate data and have less-critical requirements due to business needs and operational environments. For example, IT systems often have less critical emergency interaction, a higher tolerance to deficiencies in system availability, and a shorter component lifetime. Although some DCS vendors have adopted IT systems for control platforms, they continue to face challenges in multiple areas that may not be resolved by current IT environments. These challenges could include:
 lack of proper security controls embedded into physical systems due to the need for higher availability;
 frequent hardware investments due to periodic IT system refreshes (such as once every 3-5 years);
 forced downtime during migrations and maintenance of IT system-based control platforms due to lack of good redundancy solutions;
 need to maintain hot/cold spares for IT system-based control platforms for disaster recovery and backup scenarios; and
 system limits due to the lack of capability to scale up/down (such as elasticity) in physical systems.

These issues not only can affect financials through increased capital and operational expenditures but can also lower productivity. Moreover, these issues can expose security vulnerabilities in legacy systems deployed in critical infrastructure sectors.

To address these or other issues, embodiments of this disclosure provide a cloud-based virtual engineering platform (VEP) that allows a control platform to execute "in the cloud" and provide secure native communication with remotely-located embedded devices. In this document, the phrase "embedded device" refers to a node or device that resides at Level 1 of the Purdue model, such as a gateway, controller, or interface module. The disclosed embodiments overcome challenges faced in physical IT system-based deployments by leveraging cloud features while maintaining the same control features and capabilities. The disclosed embodiments also improve deployment flexibility for system operators.

Figure 2:
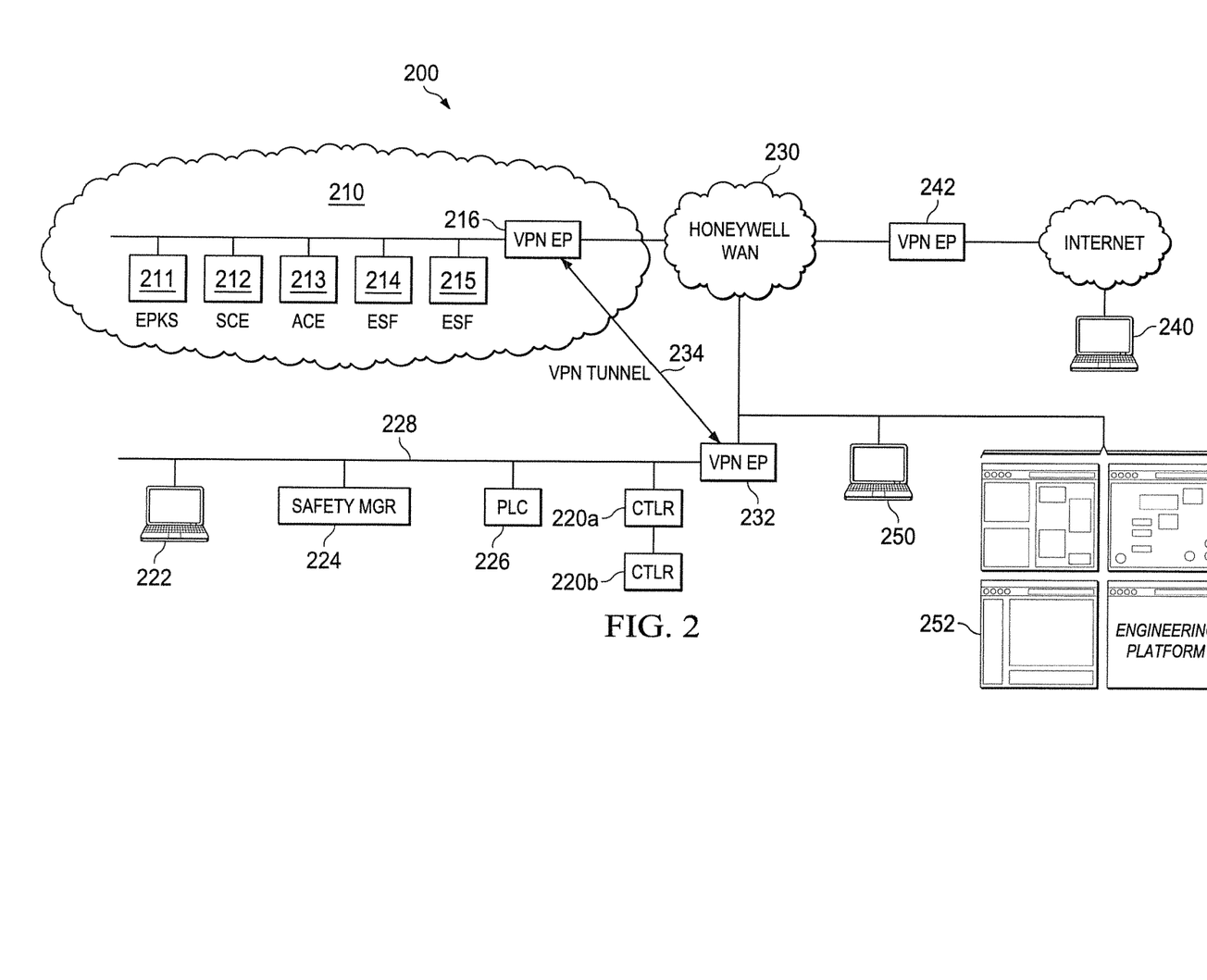
FIG. 2 illustrates an example system that uses a cloud-based control platform for a distributed control system according to this disclosure.

FIG. 2 illustrates an example system 200 that uses a cloud-based control platform for a DCS according to this disclosure. The system 200 includes various components that can be used in conjunction with an industrial process control and automation system, such as the system 100 of FIG. 1. However, the system 200 can be used with any other suitable system or device.

As shown in FIG. 2, the system 200 includes a virtual (cloud-based) control platform 210 and multiple controllers 220a-220b that are controlled by the control platform 210. The control platform 210 includes multiple control components that can be located remotely from the controllers 220a-220b and can communicate with the controllers 220a-220b over a VPN or other secure network. In this example, the control platform 210 includes an EXPERION Process Knowledge System (EPKS) server 211, an EXPERION Simulation Control Environment (SCE) 212, an EXPERION ACE 213, multiple operator stations 214-215, and a VPN endpoint (EP) 216. Note, however, that the control platform 210 could be implemented using any other suitable technology and is not limited to implementation with EXPERION technology.

The EPKS server 211 is a web server that enables access to the control platform 210. The SCE 212 provides a simulation environment for simulating and configuring controllers and other components of a DCS. Operation and configuration of the EPKS server 211 and the SCE 212 are well-known in the art, and further description of these components is omitted here.

The ACE 213 provides a standard control platform execution environment for the control platform 210. As described above, the ACE 213 can be utilized for a wide variety of applications that do not require an embedded controller. For example, the ACE 213 can be used as an execution environment for supervisory control applications, procedural operations using standard function blocks, and custom applications using custom algorithm blocks. In some embodiments, the ACE 213 can host BOOTP protocol components as described in greater detail below. In some embodiments, the ACE 213 executes on a server-grade computing platform, although the ACE 213 can execute on any suitable hardware platform with adequate processing capability and compatibility.

The operator stations 214-215 represent computing or communication devices providing user access to the control platform 210 and the controllers 220a-220b. For example, each operator station 214-215 could allow a user (such as a system engineer) to manage operations of the control platform 210. Each operator station 214-215 includes any suitable structure for supporting user access and control of one or more components in the system 200. Each operator station 214-215 could, for example, represent a computing device running a MICROSOFT WINDOWS operating system. In some embodiments, the operator stations 214-215 may be EXPERION Station Flex (ESF) stations from HONEYWELL INTERNATIONAL INC. In particular embodiments, the operator stations 214-215 may represent (or be represented by) one or more of the operation stations 116, 124, 132, 140 of FIG. 1. While two operator stations 214-215 are shown in FIG. 2, other embodiments of the system 200 may include more or fewer operator stations.

The VPN endpoint 216 represents one endpoint of a VPN tunnel 234 between the control platform 210 and the controllers 220a-220b. As shown in FIG. 2, the VPN tunnel 234 can be configured between the VPN endpoint 216 and at least one corresponding VPN endpoint 232 associated with the controllers 220a-220b. The VPN endpoints 216 and 232 are configured to communicate with each other over a wide area network (WAN) 230. In some embodiments, the VPN endpoint 216 is configured as an edge gateway, which is a virtual router for virtual networks such as a VPN. Also, in some embodiments, the VPN endpoint 232 is configured as a firewall by JUNIPER NETWORKS, although other suitable firewalls supporting VPN connectivity may be used. Each VPN endpoint 216 and 232 is configured to provide network services such as Dynamic Host Configuration Protocol (DHCP), firewall, static routing, and load balancing functions. Each VPN endpoint 216 and 232 represents any suitable structure for providing one endpoint of a VPN, such as any suitable hardware or combination of hardware and software/firmware instructions. Further details of the VPN tunnel 234 are provided below.

In addition to the controllers 220a-220b, the system 200 includes other components in communication with the control platform 210. These components can include a BOOTP server 222, a safety manager 224, and a programmable logic controller (PLC) 226. In some embodiments, the controllers 220a-220b, BOOTP server 222, safety manager 224, and PLC 226 represent different Level 1 components in a process control and automation system. As a particular example, the controllers 220a-220b and the PLC 226 can represent (or be represented by) one or more of the controllers 106 of FIG. 1.

The BOOTP server 222 is a computing device, such as a personal computer or laptop, which executes a local bootstrapping helper. BOOTP stands for Bootstrap Protocol, which is a host configuration protocol that allows predefined and vendor-specific extensions to be included in both request and response communications. A local bootstrapping helper is an application that can be executed for distribution of the VPN bootstrapping components as described in greater detail below. The local bootstrapping helper typically only needs to execute when VPN bootstrapping components are being distributed, such as when the controllers 220a-220b are powering on. At other times, the BOOTP server 222 can be idle, used for other purposes, or powered off.

The controllers 220a-220b, BOOTP server 222, safety manager 224, and PLC 226 can communicate with each other and with the VPN endpoint 232 over a local sub-network 228. For example, the sub-network 228 could transport control signals from the control platform 210 to the controllers 220a-220b and transport bootstrapping information from the BOOTP server 222 to the controllers 220a-220b and the control platform 210. The sub-network 228 could represent any suitable network or combination of networks, including one or more of the networks 104, 108, 112, 120, 128, 136 of FIG. 1. As particular examples, the sub-network 228 could represent an Ethernet network, an electrical signal network (such as a HART or FOUNDATION FIELDBUS network), a pneumatic control signal network, or any other or additional type(s) of network(s).

The system 200 also includes a remote operator station 240 and a VPN endpoint 242. The operator station 240 represents a computing or communication device providing user access to the control platform 210. For example, the operator station 240 could allow a remote operator (such as a system engineer) to securely connect into the control platform 210 to view or control operations of any of the elements of the control platform 210 (such as the EPKS server 211, SCE 212, ACE 213, or operator stations 214-215) or the controllers 220a-220b. The operator station 240 could, for example, represent a computing device running a MICROSOFT WINDOWS operating system. The VPN endpoint 242 is used to establish a VPN between the operator station 240 and the control platform 210. In some embodiments, the VPN endpoint 242 could be a CISCO SSL VPN device. Using an Internet-based VPN connection enabled by the operator station 240 and the VPN endpoint 242, the remote operator does not have to be on the premises of the control platform 210 or the controllers 220a-220b in order to view or control operations of these components. As long as the operator station 240 is capable of connecting to the Internet or other network and to the VPN, the remote operator can access the control platform 210 or the controllers 220a-220b from virtually anywhere. While FIG. 2 illustrates one operator station 240, the system 200 could include any number of operator stations 240.

The system 200 further includes an operator station 250 and a thin client 252. Similar to the operator station 240, the operator station 250 and the thin client 252 provide user access to the control platform 210. However, the operator station 250 and the thin client 252 are directly connected to the WAN 230. That is, the operator station 250 and the thin client 252 do not need a VPN or Internet connection to communicate with the control platform and can be configured with a WAN connection. The operator station 250 includes any suitable structure for supporting user access and control of one or more components in the system 200. The operator station 250 could, for example, represent a computing device running a MICROSOFT WINDOWS operating system. The thin client 252 is an application executing on another device and provides a view into the control platform 210. While FIG. 2 illustrates one operator station 250 and one thin client 252, the system 200 could include any number of operator stations 250 and thin clients 252.

In the system 200, the cloud-based control platform 210 communicates with and controls the controllers 220a-220b in real time. For example, the ACE 213 can provide control instructions to and receive feedback from the remotely-located controllers 220a-220b. In order to provide a real-time remote control operation environment, the VPN tunnel 234 can be configured first and then the bootstrapping components of the connection can be distributed.

Configuration of VPN Tunnel

As an initial step, the VPN tunnel 234 can be securely configured. Configuration of the VPN tunnel 234 may include defining and configuring the VPN endpoints 216 and 232. In one aspect of operation, the VPN endpoint 216 is configured to define a VEP access point for remote devices (such as the controllers 220a-220b, BOOTP server 222, safety manager 224, and PLC 226) to access the control platform 210 and its components 211-215. The following configuration information can be provided to the VPN endpoint 216:

Name: a descriptive name;
Peer Network: the IP address range of the remote sub-network;
Peer ID/Peer IP: the address of the VPN endpoint;
Encryption type: the type of encryption used for the VPN (this may include a certificate-based encryption technique, such as RSA, DSA, or ECC); and
Shared secret: secret information used for encryption and decryption.

Similarly, the VPN endpoint 232 can be configured to define a local sub-network access point for VEP access to the remote Level 1 devices (such as the controllers 220a-220b, BOOTP server 222, safety manager 224, and PLC 226). The following configuration information can be provided to the VPN endpoint 232:

Local Name: a descriptive name;
Local Time Zone of the VPN endpoint 232;
Peer IP: The IP address of the VPN endpoint 216;
Local IP address: The IP address of the VPN endpoint 232; and
Shared secret: secret information used for encryption and decryption.

For additional security, the shared secret can be securely provided to the VPN endpoint 232 through one or more out-of-band delivery mechanisms (such as emailed, physically mailed in a postal system, by facsimile, or orally communicated over a telephone communication). In some embodiments, one or both VPN endpoints 216 and 232 are further configured or secured to only allow data and information associated with the DCS to pass through the VPN tunnel 234.

Once the VPN endpoints 216 and 232 are configured individually and for communication between each other, the configuration of the VPN tunnel 234 is complete. In some embodiments, the configuration of the VPN tunnel 234 is a one-time initial setup step. Once the VPN tunnel 234 is configured, the VPN tunnel 234 can stay active, and the configuration process outlined above will not need to be repeated unless and until the VPN tunnel 234 is decommissioned.

Distribution of Bootstrapping Components

DHCP is a host configuration protocol developed after BOOTP. Together, BOOTP and DHCP provide information (such as IP addresses) to Level 1 embedded devices in a DCS during startup using broadcast requests and point-to-point User Datagram Protocol (UDP) responses. Typically, this is accomplished using a bootstrapping helper that is local to the control platform that controls the embedded devices. In systems where the control platform and embedded devices are local to each other, the bootstrapping helper is also local, and communication is easily performed over a local network connection. In systems with a cloud-based control platform, the bootstrapping helper would be located in the cloud as well and would be remote from the embedded devices. This could require the bootstrapping components to be broadcast to the remote embedded devices over a VPN connection.

However, pass-through of bootstrapping broadcast traffic through a secure VPN tunnel can be a challenge due to inherent difficulties of broadcast communications over a VPN connection. To address this challenge, the bootstrapping helper in the system 200 is located at the BOOTP server 222, which is connected locally with the controllers 220a-220b over the local sub-network 228. The local sub-network 228 allows broadcast communication of the bootstrapping components from the BOOTP server 222 to the controllers 220a-220b with little or no difficulty. In this configuration, BOOTP/DHCP can be placed in the local sub-network 228 and synchronized with the main BOOTP in the control platform 210.

Figure 3:
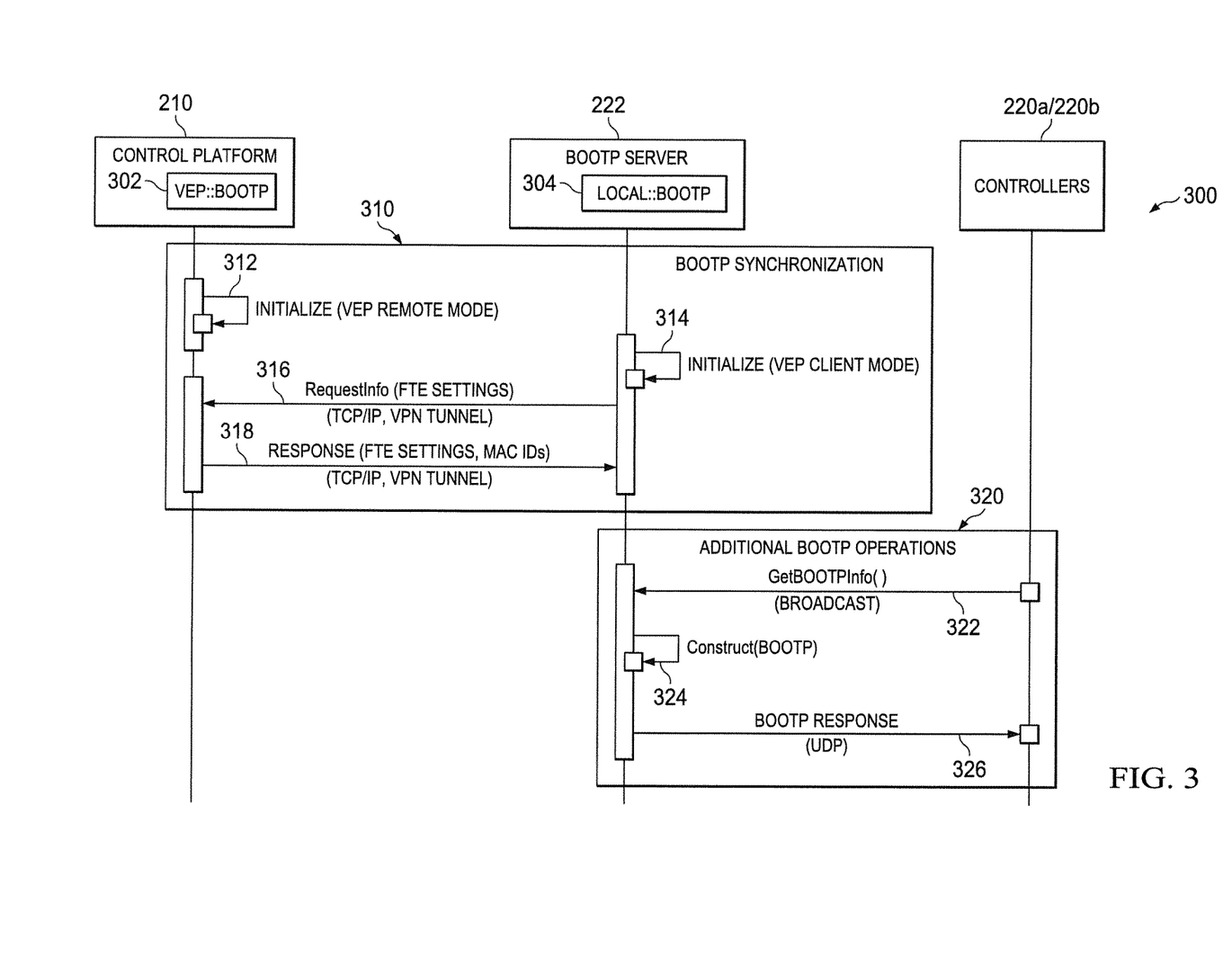
FIG. 3 illustrates an example process for distribution of bootstrapping components for the system of FIG. 2 according to this disclosure.

FIG. 3 illustrates an example process 300 for distribution of bootstrapping components for the system 200 according to this disclosure. While the process 300 is described in conjunction with the system 200, the process 300 could be used in any other suitable system.

As shown in FIG. 3, the process 300 is performed using the control platform 210, the BOOTP server 222, and one or more of the controllers 220a-220b. BOOTP (identified in FIG. 3 as VEP::BOOTP 302) is configured and deployed on one or more components of the control platform 210, such as the ACE 213. Similarly, BOOTP/DHCP (identified in FIG. 3 as LOCAL::BOOTP 304) is configured and deployed on the BOOTP server 222.

The process 300 includes a BOOTP synchronization process 310 and additional BOOTP operations 320. The BOOTP synchronization process 310 includes synchronization steps and communications between the VEP::BOOTP 302 deployed at the control platform 210 and the LOCAL::BOOTP 304 deployed at the BOOTP server 222. The VEP::BOOTP 302 at the control platform 210 can be installed in a BOOTP-remote mode and perform point-to-point communication with the LOCAL::BOOTP 304 at the BOOTP server 222. The LOCAL::BOOTP 304 can assume the responsibilities of distributing information to all Level 1 embedded nodes, such as the controllers 220a-220b. The LOCAL::BOOTP 304 may communicate with the VEP::BOOTP 302 using point-to-point communication and retrieve configuration information necessary for constructing responses for the controllers 220a-220b and other Level 1 embedded nodes.

The BOOTP synchronization process 310 includes an initialization operation 312 at the control platform 210 and an initialization operation 314 at the BOOTP server 222. Each initialization operation 312-314 can be performed independently and locally to initialize the corresponding BOOTP 302-304.

After the initialization operations 312-314, the BOOTP server 222 transmits a RequestInfo message 316 to the control platform 210 through the VPN tunnel 234. After receipt of the RequestInfo message 316, the control platform 210 transmits a Response message 318 to the BOOTP server 222. The Response message 318 can include one or more FTE or other network settings, MAC identifiers (IDs), and the like.

Once the BOOTP synchronization process 310 is completed between the VEP::BOOTP 302 at the control platform 210 and the LOCAL::BOOTP 304 at the BOOTP server 222, additional BOOTP operations 320 can be performed as known in the art. For example, a GetBOOTPInfo( ) message 322 can be transmitted by one or more of the controllers 220a-220b to the BOOTP server 222. In response to receiving the GetBOOTPInfo( ) message 322, the BOOTP server 222 can determine (construct) BOOTP-related information 324 and transmit the information to the controller(s) 220a-220b in a BOOTP response message 326.

After the VPN tunnel 234 is configured and the bootstrapping components to have been distributed (such as according to the process 300), the controllers 220a-220b can be configured and operated in a runtime production environment. In the runtime production environment, control of the controllers 220a-220b is provided by the cloud-based control platform 210. In particular, the cloud-based control platform 210 and controllers 220a-220b can implement various DCS features including supervisory control applications, procedural operations using standard function blocks, custom applications using custom algorithm blocks, multiple selectable execution periods, shared standard function blocks with different types of controllers, inter-cluster communication, control integration and peer-to-peer integration with other embedded controllers using native communication protocols (e,g., EXPERION CDA), OPC integration into a control environment, and multivariable control and optimization technology.

Although FIG. 2 illustrates one example of a system that uses a cloud-based control platform for a DCS, various changes may be made to FIG. 2. For example, the arrangement shown in FIG. 2 is for illustration only. Components could be added, omitted, combined, or placed in any other suitable configuration according to particular needs. Also, FIG. 2 illustrates one example environment in which a process for distribution of bootstrapping components can be supported. This functionality can be used in any other suitable device or system, and the device or system need not be related to industrial process control and automation.

Figure 4:
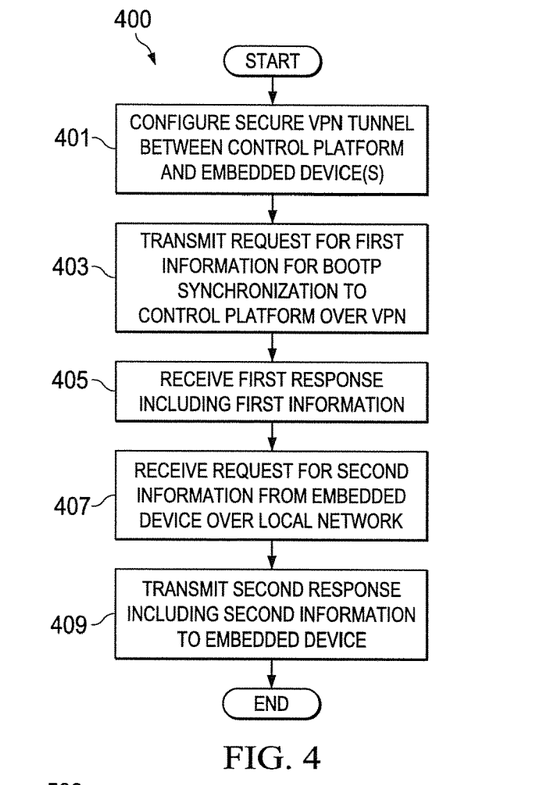
FIG. 4 illustrates an example method for cloud-based control of remote embedded devices in a distributed control system according to this disclosure.

FIG. 4 illustrates an example method 400 for cloud-based control of remote embedded devices in a distributed control system according to this disclosure. For ease of explanation, the method 400 is described as being performed using the system 200 of FIG. 2. However, the method 400 could be used with any suitable device or system.

A secure VPN tunnel is configured between a remotely-located control platform and one or more embedded devices at step 401. This could include, for example, configuring the secure VPN tunnel 234 in the system 200 between the control platform 210 and the controller(s) 220a-220b. A request for first information associated with a BOOTP protocol synchronization process is transmitted over the VPN to the remotely-located control platform at step 403. This could include, for example, the BOOTP server 222 transmitting the request to the control platform 210. This may also include one or both of the control platform 210 and the BOOTP server 222 initializing one or more BOOTP protocol components before the request is transmitted.

A first response including the first information is received in the system 200 at step 405. This could include, for example, the BOOTP server 222 receiving a response message from the control platform 210 that includes the first information. In some embodiments, the first information includes one or more Ethernet settings, one or more MAC identifiers, or a combination of these. A request for second information is received from the embedded device(s) over a local network at step 407. This could include, for example, the BOOTP server 222 receiving a request for second information from the controller(s) 220a-220b over the local sub-network 228. A second response including second information is transmitted to the embedded device(s) at step 409. This could include, for example, the BOOTP server 222 transmitting a BOOTP response message to controller(s) 220a-220b over the local sub-network 228. In some embodiments, the second response is a UDP response message.

Although FIG. 4 illustrates one example of a method 400 for cloud-based control of remote embedded devices in a distributed control system, various changes may be made to FIG. 4. For example, while shown as a series of steps, various steps shown in FIG. 4 could overlap, occur in parallel, occur in a different order, or occur multiple times.

Moreover, some steps could be combined or removed and additional steps could be added according to particular needs. In addition, while the method 400 is described with respect to the system 200 (which itself was described with respect to an industrial process control and automation system), the method 400 may be used in conjunction with other types of devices and systems.

Figure 5:
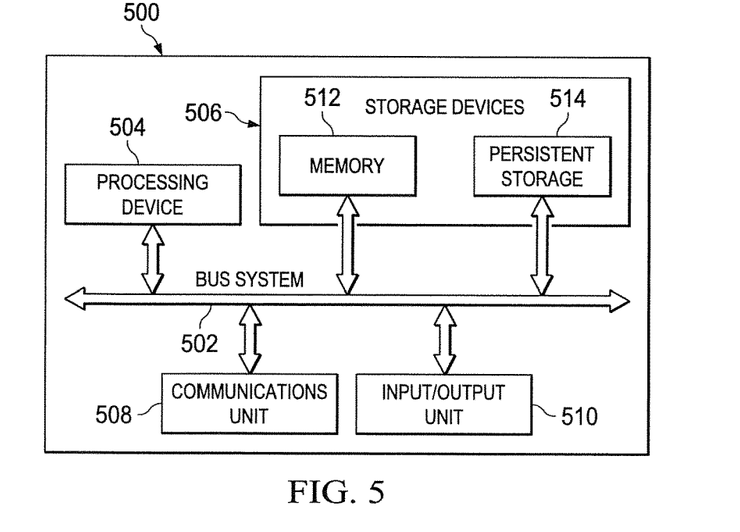
FIG. 5 illustrates an example device for performing functions associated with cloud-based control of remote embedded devices in a distributed control system according to this disclosure.

FIG. 5 illustrates an example device 500 for performing functions associated with cloud-based control of remote embedded devices in a distributed control system according to this disclosure. The device 500 could, for example, represent a computing device in the system 200 of FIG. 2, such as the ACE 213 or the BOOTP server 222. The device 500 could represent any other suitable device for performing functions associated with cloud-based control of an embedded controller in a distributed control system.

As shown in FIG. 5, the device 500 can include a bus system 502, which supports communication between at least one processing device 504, at least one storage device 506, at least one communications unit 508, and at least one input/output (I/O) unit 510. The processing device 504 executes instructions that may be loaded into a memory 512. The processing device 504 may include any suitable number(s) and type(s) of processors or other devices in any suitable arrangement. Example types of processing devices 504 include microprocessors, microcontrollers, digital signal processors, field programmable gate arrays, application specific integrated circuits, and discrete circuitry.

The memory 512 and a persistent storage 514 are examples of storage devices 506, which represent any structure(s) capable of storing and facilitating retrieval of information (such as data, program code, and/or other suitable information on a temporary or permanent basis). The memory 512 may represent a random access memory or any other suitable volatile or non-volatile storage device(s). The persistent storage 514 may contain one or more components or devices supporting longer-term storage of data, such as a read only memory, hard drive, Flash memory, or optical disc. In accordance with this disclosure, the memory 512 and the persistent storage 514 may be configured to store instructions associated with configuring or performing cloud-based control of an embedded controller in a distributed control system.

The communications unit 508 supports communications with other systems, devices, or networks, such as the networks 110-120. For example, the communications unit 508 could include a network interface that facilitates communications over at least one Ethernet network. The communications unit 508 could also include a wireless transceiver facilitating communications over at least one wireless network. The communications unit 508 may support communications through any suitable physical or wireless communication link(s).

The I/O unit 510 allows for input and output of data. For example, the I/O unit 510 may provide a connection for user input through a keyboard, mouse, keypad, touchscreen, or other suitable input device. The I/O unit 510 may also send output to a display, printer, or other suitable output device.

Although FIG. 5 illustrates one example of a device 500 for performing functions associated with cloud-based control of remote embedded devices in a distributed control system, various changes may be made to FIG. 5. For example, various components in FIG. 5 could be combined, further subdivided, or omitted and additional components could be added according to particular needs. Also, computing devices can come in a wide variety of configurations, and FIG. 5 does not limit this disclosure to any particular configuration of device.

As described above, the disclosed embodiments instantiate a control platform "in the cloud" and allow connectivity to embedded devices located remotely relative to the control platform, thereby overcoming challenges typically associated with physical IT-based systems. For example, the disclosed embodiments can improve security by providing a secure tunnel between a control platform and remotely-located embedded nodes. As another example, the cloud-based control platform can improve availability in a number of scenarios, including maintenance (such as frequent IT system refreshes), migrations, and unplanned shutdowns. Moreover, recovery and backup scenarios can be improved by leveraging cloud-based backup and recovery options inherently found in the cloud-based control platform. In addition, system limits can be easily and significantly expanded due to highly-elastic cloud components that enable scaling up and down with relative ease.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc, a digital video disc, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, e.g., a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for communicating between a remotely-located control platform and an embedded device in a distributed control system over a virtual private network (VPN), comprising:
communicatively coupling a bootstrapping server to the embedded device via a local network;
transmitting, over the VPN to the remotely-located control platform, a request for first information associated with a BOOTP protocol synchronization process;
receiving, from the control platform, a first response comprising the requested first information;
receiving, over the local network from an embedded device in the distributed control system, a request for second information associated with the BOOTP protocol; and
transmitting, to the embedded device, a second response comprising the requested second information,
wherein:
the VPN comprises a VPN tunnel between first and second VPN endpoints,
the second VPN endpoint is communicatively coupled to the embedded device and the bootstrapping server by the local network, and
at least one of the first and second VPN endpoints is configured to only allow information associated with the distributed control system to pass through the VPN tunnel.

2. The method of claim 1, further comprising:
initializing one or more BOOTP protocol components before transmitting the request for first information.

3. The method of claim 1, wherein the first information comprises at least one of: one or more Ethernet settings and one or more MAC identifiers.

4. The method of claim 1, wherein the second response comprises a User Datagram Protocol (UDP) response.

5. The method of claim 1, wherein the embedded device comprises a Level 1 controller in an industrial process control and automation system.

6. The method of claim 1, wherein the control platform is configured to control the embedded device over the VPN after the second response is transmitted to the embedded device.

7. An apparatus for communicating between a remotely-located control platform and an embedded device in a distributed control system over a virtual private network (VPN), comprising:

at least one network interface stored in a memory configured to receive and transmit data over at least one network; and at least one processing device having a hardware processor configured to control the at least one network interface to:

communicatively couple to a bootstrapping server to the embedded device, having a hardware processor, via a local network;

transmit, over the VPN to the remotely-located control platform stored in a memory, a request for first information associated with a BOOTP protocol synchronization process;

receive, from the control platform, a first response comprising the requested first information;

receive, over the local network from the embedded device in the distributed control system, a request for second information associated with the BOOTP protocol; and transmit, to the embedded device, a second response comprising the requested second information, wherein:

the VPN comprises a VPN tunnel between first and second VPN endpoints, the second VPN endpoint is communicatively coupled to the embedded device and the bootstrapping server by the local network, and at least one of the first and second VPN endpoints is configured to only allow information associated with the distributed control system to pass through the VPN tunnel.

8. The apparatus of claim 7, wherein the at least one processing device is further configured to initialize one or more BOOTP protocol components before transmitting the request for first information.

9. The apparatus of claim 7, wherein the first information comprises at least one of: one or more Ethernet settings or one or more MAC identifiers.

10. The apparatus of claim 7, wherein the second response comprises a User Datagram Protocol (UDP) response.

11. The apparatus of claim 7, wherein the embedded device comprises a Level 1 controller in an industrial process control and automation system.

12. The apparatus of claim 7, wherein the control platform is configured to control the embedded device over the VPN after the second response is transmitted to the embedded device.

13. A system comprising:

an embedded device having a hardware processor in a distributed control system;

a control platform stored in a memory configured for communication with the distributed control system over a virtual private network (VPN), the control platform located remotely from the embedded device, the control platform configured to support native communication with the embedded device; and a bootstrapping server having a hardware processor communicatively coupled to the embedded device by a local network, the bootstrapping server configured to:

transmit, over the VPN to the control platform, a request for first information associated with a BOOTP protocol synchronization process;

receive, from the control platform, a first response comprising the requested first information;

receive, over the local network from the embedded device, a request for second information associated with the BOOTP protocol; and transmit, to the embedded device, a second response comprising the requested second information, wherein:

the VPN comprises a VPN tunnel between first and second VPN endpoints, the second VPN endpoint is communicatively coupled to the embedded device and the bootstrapping server by the local network, and at least one of the first and second VPN endpoints is configured to only allow information associated with the distributed control system to pass through the VPN tunnel.

14. The system of claim 13, wherein the bootstrapping server is further configured to initialize one or more BOOTP protocol components before transmitting the request for first information.

15. The system of claim 13, wherein the first information comprises at least one of: one or more Ethernet settings or one or more MAC identifiers.

16. The system of claim 13, wherein the second response comprises a User Datagram Protocol (UDP) response.

17. The system of claim 13, wherein the embedded device comprises a Level 1 controller in an industrial process control and automation system.

18. The system of claim 13, wherein the control platform is configured to control the embedded device over the VPN after the second response is transmitted to the embedded device.

19. The system of claim 13, wherein the control platform is hosted in the cloud and comprises at least one of: one or more supervisory control applications, one or more procedural operations using standard function blocks, one or more custom applications using custom algorithm blocks, multiple selectable execution periods, one or more shared standard function blocks with different types of controllers, inter-cluster communication, Open Platform Communications (OPC) integration into a control environment, and multivariable control and optimization technology.

* * * * *